United States Patent
Palinkas et al.

(10) Patent No.: US 9,765,679 B2
(45) Date of Patent: Sep. 19, 2017

(54) EXHAUST GAS TREATMENT DEVICE

(71) Applicant: Eberspächer Exhaust Technology GmbH & Co. KG, Neunkirchen (DE)

(72) Inventors: Marc Palinkas, Esslingen (DE); Andreas Balle, Esslingen (DE); Silvia Calvo Zueco, Esslingen (DE)

(73) Assignee: EBERSPÄCHER EXHAUST TECHNOLOGY GMBH & CO. KG, Neunkirchen (DE)

( * ) Notice: Subject to any disclaimer, the term of this patent is extended or adjusted under 35 U.S.C. 154(b) by 0 days.

(21) Appl. No.: 14/927,599

(22) Filed: Oct. 30, 2015

(65) Prior Publication Data
US 2016/0123212 A1    May 5, 2016

(30) Foreign Application Priority Data

Oct. 31, 2014  (DE) .................. 10 2014 222 296

(51) Int. Cl.
  *F01N 13/18*    (2010.01)
  *F01N 3/20*    (2006.01)
  *F01N 3/28*    (2006.01)
  *B01F 5/06*    (2006.01)

(52) U.S. Cl.
  CPC ............ *F01N 13/18* (2013.01); *B01F 5/0618* (2013.01); *F01N 3/2066* (2013.01); *F01N 3/2892* (2013.01); *B01F 2005/0639* (2013.01); *F01N 2240/20* (2013.01); *F01N 2610/02* (2013.01); *Y02T 10/24* (2013.01)

(58) Field of Classification Search
  CPC ...... F01N 13/18; F01N 3/2066; F01N 3/2892;
                                    B01F 5/0602

USPC .................................................... 60/320, 324
See application file for complete search history.

(56) References Cited

U.S. PATENT DOCUMENTS

| | | | | |
|---|---|---|---|---|
| 2003/0110763 A1* | 6/2003 | Pawson | ............... | B01D 53/9431 60/286 |
| 2010/0293931 A1* | 11/2010 | Peters | ................ | B01D 53/9431 60/324 |
| 2013/0074480 A1* | 3/2013 | Leicht | ................... | B01F 5/0473 60/295 |
| 2013/0104531 A1 | 5/2013 | Cho et al. | | |

(Continued)

FOREIGN PATENT DOCUMENTS

| DE | 10 2008 028 626 A1 | 10/2009 |
|---|---|---|
| DE | 10 2008 054268 A1 | 5/2010 |

(Continued)

*Primary Examiner* — Patrick Maines
(74) *Attorney, Agent, or Firm* — McGlew and Tuttle, P.C.

(57) ABSTRACT

An exhaust gas treatment device (1), for an exhaust system (1) of an internal combustion engine, includes a housing (2), providing an exhaust path (3), an injector (4) arranged on the housing (2) for introducing a reduction agent into an exhaust gas flow following the exhaust gas path (3), and a mixer (7) arranged in the housing (2). The mixer (7) includes a shell (8), which encloses a mixer cross section (10) through which the exhaust gas flow can flow. The mixer (7) includes multiple guide blades (11), which on a shell inside project from the shell (8) and project into the mixer cross section (10). A simplified producibility is obtained with the mixer (7) including multiple straps (13), on a shell outside (14), which project from the shell (8) and project into a strap opening (16) formed on the housing (2) and penetrate a housing wall (15).

14 Claims, 9 Drawing Sheets

(56) References Cited

U.S. PATENT DOCUMENTS

| | | | |
|---|---|---|---|
| 2013/0188444 A1* | 7/2013 | Palmer .................. | B01F 5/0473 366/337 |
| 2014/0109557 A1* | 4/2014 | Calvo ..................... | F01N 3/106 60/301 |
| 2015/0315943 A1 | 11/2015 | Gschwind | |

FOREIGN PATENT DOCUMENTS

| | | |
|---|---|---|
| DE | 10 2009 014 433 A1 | 9/2010 |
| DE | 20 2012 011 764 U1 | 1/2013 |
| DE | 10 2011 083 636 A1 | 3/2013 |
| DE | 10 2012 016 423 B3 | 2/2014 |
| EP | 2 098 697 A1 | 9/2009 |
| EP | 2 535 535 A1 | 12/2012 |
| JP | 2000-154720 A | 6/2000 |
| JP | 2005-155404 A | 6/2005 |
| JP | 2011-099359 A | 5/2011 |
| JP | 2011 111927 A | 6/2011 |
| JP | 2014-040828 A | 3/2014 |
| WO | 2014/025538 A1 | 2/2014 |

\* cited by examiner

EXHAUST GAS TREATMENT DEVICE

CROSS REFERENCE TO RELATED APPLICATIONS

This application claims the benefit of priority under 35 U.S.C. §119 of German Patent Application 10 2014 222 296.6 filed Oct. 31, 2014, the entire contents of which are incorporated herein by reference.

FIELD OF THE INVENTION

The present invention relates to an exhaust gas treatment device for an exhaust system of an internal combustion engine, which can be arranged for example in a motor vehicle.

BACKGROUND OF THE INVENTION

For aftertreatment of exhaust gases of an internal combustion engine it can be required to introduce a liquid reactant into the exhaust gas flow. It can be required, for example, to introduce water or fuel into the exhaust gas flow. However, so-called SCR-systems, SCR standing for "selective catalytic reduction", are of particular interest. With such an SCR system, attempts are made with the help of a reduction agent to reduce harmful nitrogen oxides contained in the exhaust gas to harmless nitrogen. A possible reduction agent in this case is ammonia. This is generally introduced into the exhaust gas flow in the form of a watery urea solution. Through thermolysis and hydrolysis, an efficient mixture of ammonia and carbon dioxide is created from this, which makes it possible in conjunction with an SCR-catalytic converter, to convert nitrogen oxides into nitrogen and water. In order for the respectively desired reaction to take place as efficiently as possible, extensive evaporation of the introduced liquid reactant and as homogeneous as possible a mixing-through of the reactant with the exhaust gas flow is required. For this purpose, stationary mixers are employed which are installed in a housing of the exhaust gas treatment device, specifically with respect to the exhaust gas flow downstream of an injector for introducing the reduction agent.

Since the exhaust gases of an internal combustion engine, depending on the operating state, can reach relatively high temperatures, efficient fixing of the mixer in the housing is required. Furthermore, exhaust gas treatment devices are products which are produced within the scope of large series. To this end, the construction of the exhaust gas treatment device has to be realizable as cost-effectively as possible.

SUMMARY OF THE INVENTION

The present invention deals with the problem of providing an improved embodiment for an exhaust gas treatment device of the type mentioned above, which is characterized in particular through cost-effective producibility. The aim at the same time is efficient and durable fixing of the mixer in the housing.

According to the invention an exhaust gas treatment device for an exhaust system of an internal combustion engine is provided. The device comprises a housing defining an exhaust gas path, an injector arranged on the housing for introducing a reduction agent into an exhaust gas flow following the exhaust gas path and a mixer arranged in the housing for mixing-through the reactant with the exhaust gas flow. The mixer comprises a shell (outer wall), which encloses a mixer cross section through which the exhaust gas flow can flow and comprises multiple guide blades, which on a shell inside project from the shell and project into the mixer cross section. The mixer further comprises multiple straps (or flanges), which on a shell outside project from the shell and in each case project into a strap opening formed on the housing and penetrate a housing wall of the housing. The mixer is a shaped single sheet metal part comprised of a single sheet metal piece, in which the shell, the guide blades and the straps are formed by the single sheet metal piece.

The invention is based on the general idea of equipping the mixer with multiple straps, which project from a shell of the mixer towards the outside and thereby engage in strap openings which are formed in a housing wall of the housing engaging about the mixer. During the production of the exhaust gas treatment device, the straps on the mixer side make possible simple positioning of the mixer in the housing in that the straps engage in the associated strap openings in a positively joined manner. Because of this it is possible in particular to at least temporarily fix the mixer on the housing via the straps engaging in the strap openings, so that final fixing can be carried out at a later time. Up to then, the handling of the housing with inserted mixer is simplified and in particular the further completion or production of the exhaust gas treatment device.

Furthermore, it is of special interest that the mixer is designed as a shaped sheet metal part which is characterized in that the mixer is produced by forming from a single sheet metal piece which comprises the shell, guide blades projecting there from and the aforementioned straps, wherein the forming can obviously be preceded by cutting processes and punching processes. Such a unitary shaped sheet metal part can be produced particularly cost-effectively, handle easily and inserted in the housing. By integrating the straps on this shaped sheet metal part, additional separate fastening means for fixing the mixer in the housing can be omitted.

In detail, the mixer comprises said shell which encloses a mixer cross section through which an exhaust gas flow can flow. During the operation of the exhaust system, the exhaust gas flow follows an exhaust gas path which passes through the housing of the exhaust gas treatment device. The aforementioned guide blades project from the shell on a shell inside and project into the mixer cross section. The guide blades can generate swirling of the exhaust gas flow through their geometrical shape and through their blade angle with respect to the exhaust gas flow, which is advantageous for intensive mixing-through between reactant and exhaust gas.

According to an advantageous embodiment, the straps in each case can be fastened to the housing from the outside by means of a welded connection, wherein the respective welded connection closes off the associated strap opening. By providing the welded connections on a wall outside of the housing wall facing away from the mixer, the previously mentioned final fixing of the mixer in the housing can also be performed with closed housing, which substantially simplifies the production of the exhaust gas treatment device. By using a welded connection, the strap openings, at the same time, can be additionally closed off sufficiently gastight in order to avoid undesirable leakages in the region of the strap openings.

In another embodiment, the mixer, on its shell outside, can be radially supported via supporting zones on a wall inside of the housing wall, wherein the supporting zones are arranged distributed in the circumferential direction of the shell and spaced from one another. As a consequence, an air gap is formed radially between the shell outside and the wall inside outside the strap and outside the supporting zones which acts as thermal insulation between mixer and housing. With the help of the supporting zones which are distributed in the circumferential direction and spaced from one another, only a local contacting that is limited to few places thus takes place between mixer and housing or between shell and housing wall, which on the one hand makes possible larger manufacturing tolerances and on the other hand reduces a heat transfer between mixer and housing through heat conduction to few, small singular places. In the air gap, by contrast, a heat transfer takes place only through heat radiation, which corresponds to efficient thermal insulation. A radially measured gap width of the air gap in this case can be smaller than a wall thickness of the shell and/or a wall thickness of the housing wall in the region of the mixer.

According to an advantageous further development, the supporting zones can be formed by elevations, which, through forming, are integrally shaped only on the housing wall. Alternatively, an embodiment is also possible, in which the supporting zones are formed by elevations, which are integrally shaped by forming only on the shell. Likewise, mixed forms may be provided in which the supporting zones are formed by elevations, which are integrally shaped by forming both on the housing wall and also on the shell. Preferred, however, is a configuration, in which the elevations are integrated in the housing wall.

Particularly preferably in this case is a further development, in which the supporting zones in each case are formed in the region of the straps. In other words, the respective strap and the associated strap opening in this case are formed within such a supporting zone. By placing the supporting zone and the plug connections between the straps and the strap openings together, the number of contact places between shell and housing wall can be reduced, which improves the thermal insulation of the mixer relative to the housing.

In principle, however, any embodiment may be provided in which the supporting zones and the straps are formed separately and are spaced from one another in the circumferential direction of the shell.

According to another advantageous embodiment, the housing can be configured in a two-shelled manner at least in a housing section containing the mixer such that the shell outside extends in a first circumferential section along a first housing shell and along a second circumferential section along a second housing shell. The two-shelled configuration of the housing simplifies the installation of the mixer in the housing. In particular, the mixer can thus be inserted in the housing shell while the other housing shell can then be subsequently attached. In particular in the case that the mixer comprises a shell running around closed in the circumferential direction, axially inserting the mixer in a closed housing can prove difficult because of the straps which radially project to the outside. Through the shell design, the housing can now be opened for inserting the mixer. Furthermore, the two-shelled design makes possible a housing geometry which deviates from a conventional cylindrical design.

According to an advantageous further development, at least one such supporting zone each can be formed in the region of the first housing shell and in the region of the second housing shell. Accordingly, the mixer is supported both on the first housing shell as well as on the second housing shell via such supporting zones.

According to another further development, at least one such strap opening each can be formed on the first housing shell and on the second housing shell. Through this design it is achieved that the mixer is fixed both on the first housing shell and also on the second housing shell.

Practically, the mixer cross section can be flat so that a width of the mixer is greater than a height of the mixer. In particular, the mixer is at least twice as wide as high. The width and the height in this case are measured perpendicularly to one another and perpendicularly to a longitudinal direction, which is defined by the through-flow direction of the mixer or by the flow direction of the exhaust gas flow.

Practically, the guide blades can run straight and parallel to one another. In particular in connection with a flat cross section, an efficient flow guiding effect for the guide blades is obtained with such parallel guide blades. In the case of a flat shell cross section, the straight guide blades extend parallel to the height direction. Here, at least one guide blade row is formed on the shell, in the case of which the guide blades are arranged next to one another in the width direction of the shell cross section.

A particularly simple producibility of the mixer is ensured by a design in which the guide blades in each case are connected in a fixed manner to the shell at one end, while they are arranged in a free-standing manner on the other end. Thus, the guide blades project from the shell and project into the mixer cross section in a free-standing manner. Here, thermal expansion effects cannot create any stresses whatsoever of the guide blades within the mixer. Relative movements of the guide blades relative to the shell cannot create any noises either.

Particularly advantageous is an embodiment, in which the shell on an inflow-sided or outflow-sided mixer side comprises a first circumferential section and a second circumferential section, which are located opposite one another. This is true in particular for a design with flat mixer cross section. The circumferential sections that are located opposite one another then extend each along the width direction and lie opposite one another in the height direction. Practically it can now be provided that the first circumferential section comprises first guide blades which project from the first circumferential section in the direction of the second circumferential section. Thus, a first guide blade row is formed on the first circumferential section, in the case of which the first guide blades are arranged next to one another in the width direction. Furthermore, the second circumferential section comprises second guide blades, which project from the second circumferential section in the direction of the first circumferential section. Thus, the second circumferential section has a second guide blade row, in which the second guide blades are arranged next to one another in the width direction. Particularly advantageous now is an embodiment, which the first guide blades are arranged in the flow direction of the exhaust gas flow offset from the second guide blades. In this way, the guide blades of the one guide blade row are subjected to earlier inflow during the operation of the exhaust system than the guide blades of the other guide blade row. Because of this it is possible, in particular, to arrange a larger number of guide blades on the respective mixer side, since both the first circumferential section and also the second circumferential section can be utilized for this purpose. In addition it is likewise possible to arrange the first guide blades and the second guide blades with different blade angles, in particular, the first guide blades can be set at an angle opposite to the second guide blades. Because of this, the mixing-through can be substantially improved. In addition to this it is particularly easily possible through this design to take into account specific flow geometries, which form within the exhaust gas path in the region of the mixer in order to optimize the mixing-through of reactant and exhaust gas flow. To this end it can be required to arrange the first guide blades and/or the second guide blades only over a part of the height of the mixer cross section, for example the first guide blades can each extend over 50% to 75% of the height of the mixer cross section, while the second guide blades extend between 25% and 50% of the height of the mixer cross section. In particular, the first guide blades can have a greater height than the second guide blades. Likewise an embodiment may be provided in which the mixer both on its inflow side and also on its outflow side comprises to guide blade rows each, which can be arranged offset from one another in the flow direction of the exhaust gas.

It is to be understood that the features mentioned above and still to be explained in the following cannot only be used in the respective combination stated but also in other combinations or by themselves without leaving the scope of the present invention.

Preferred exemplary embodiments of the invention are shown in the drawings and are explained in more detail in the following description, wherein same reference numbers relate to same or similar or functionally same components. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
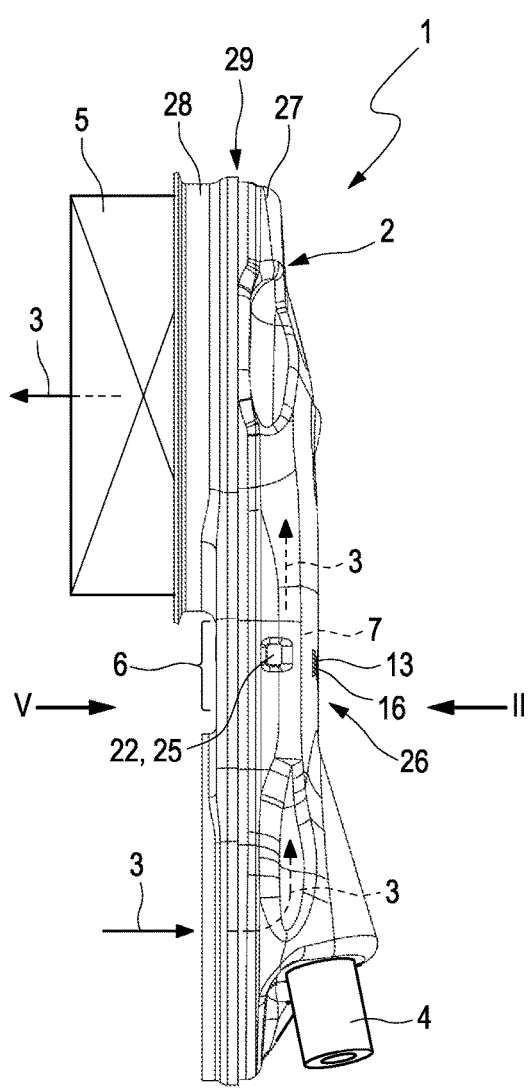
FIG. 1 is a schematic lateral view of an exhaust gas treatment device.

Referring to the drawings, according to FIG. 1, an exhaust gas treatment device 1, which is only partly shown here, which is provided for use in an exhaust system of an internal combustion engine, comprises a housing 2 which is likewise only partly shown, through which leads an exhaust gas path 3 indicated by arrows. The exhaust gas treatment device 1 additionally comprises an injector 4, which is arranged on the housing 2, and with which a reactant can be introduced into an exhaust gas flow, which during the operation of the exhaust system follows the exhaust gas path 3. According to a preferred embodiment, the exhaust gas treatment device 1 is an SCR-system, with which with the help of the injector 4, watery urea solution can be sprayed into the exhaust gas flow. In the housing 2, an SCR-catalytic converter 5 is then arranged in the exhaust gas path 3 downstream of the injector 4, which makes possible reducing nitrogen oxides to nitrogen and water by means of ammonia and carbon dioxide. In the housing 2, a static mixer 7 is additionally arranged in a mixing region 6 indicated by a brace, which is evident in the sectional views of FIGS. 3, 4, 6, 7, 9, 10, 12, 13 and in the views of the FIGS. 14 to 18. The mixer 7 serves for mixing-through the reactant with the exhaust gas flow. To this end, the mixer 7 is arranged in the exhaust gas path 3 downstream of the injector 4 and upstream of the SCR-catalytic converter 5.

As is evident in particular from the views of FIGS. 14 to 18, the mixer 7 comprises a shell 8, which in a circumferential direction 9 encloses a mixer cross section 10 through which an exhaust gas flow can flow. Furthermore, the mixer 7 comprises multiple guide blades 11, which on a shell inside 12 project from the shell 8 and project into the mixer cross section 10. As is evident in particular from the detail views of the FIGS. 4, 7, 10, 13 and 18, the mixer 7 additionally comprises multiple straps 13 which in each case project on a shell outside 14 from the shell 8 to the outside. Complementarily to the straps 13, strap openings 16 are formed in a housing wall 15 of the housing 2, wherein each strap 13 projects into such a strap opening 16. In this case, a separate strap opening 16 is provided for each strap 13. The straps 13 engaging in the strap openings 16 bring about fixing of the mixer 7 in the housing 2. This fixing in this case is effected by way of a positive connection. Final fixing of the mixer 7 in the housing 2 in this case can be effected by means of welded connections 17, with which the respective strap 13 is fastened to the housing wall 15 on a housing outside 18 namely practically in such a manner that in the process the associated strap opening 16 is closed off at the same time. In particular, the respective welded connection 17 can be formed as a weld seam which surrounds the respective strap 13 along the strap opening 16 in a closed manner. Instead of a surrounding weld seam, a pendulum seam can also be provided, which runs over and beyond the respective strap opening 16.

As is evident in particular from the FIGS. 14 to 17, the mixer 7 is preferentially configured as a shaped sheet metal part 19, which is formed by a single sheet metal piece 20, which comprises the shell 8, the guide blades 11 and the straps 13. In a starting state, the sheet metal piece 20 is flat. The guide blades 11 and the straps 13 are cut clear, for example by a punching process or a cutting process. Following this, the guide blades 11 and the straps 13 are angled relative to the remaining sheet metal piece 20. The remaining region of the sheet metal piece 20 thereby forms the shell 8, which by bending over in the circumferential direction 9 is preferably bent over so far that its longitudinal ends from a joint 21.

Practically, the mixer 7 on its shell outside 14 is radially supported on a wall inside 23 of the housing wall 15 via supporting zones 22. In this case, multiple such supporting zones 22 are provided, which are arranged distributed in the circumferential direction 9 of the shell 8 and spaced from one another. With the help of these supporting zones 22 it is achieved that the mixer 7 only supports itself on the housing 2 only locally via these supporting zones 22. In particular, the mixer 7 because of this does not have any physical contact with the housing 2 outside these supporting zones 22 and outside the plug connections, which in each case are formed by a strap 13 inserted in the associated strap opening 16. Accordingly, an air gap 24 is formed radially between the shell outside 14 and the wall inside 23 outside the straps 13 and outside the supporting zones 22. With the help of this air gap 24, an air gap insulation between mixer 7 and housing 2 is created.

Figure 2:
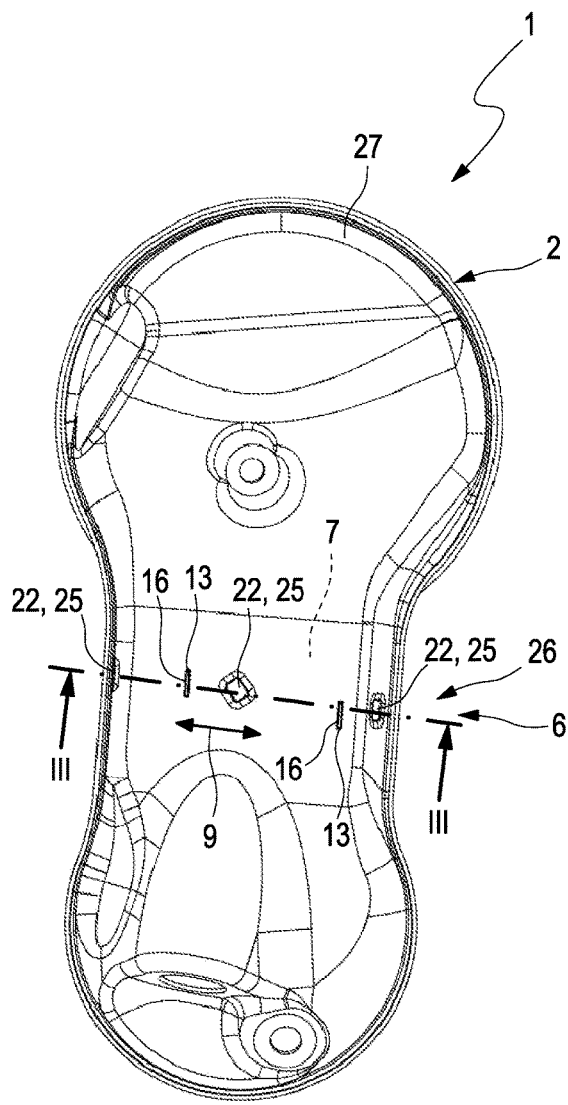
FIG. 2 is a schematic view of the exhaust gas treatment device corresponding to view direction II in FIG. 1.
Figure 3:
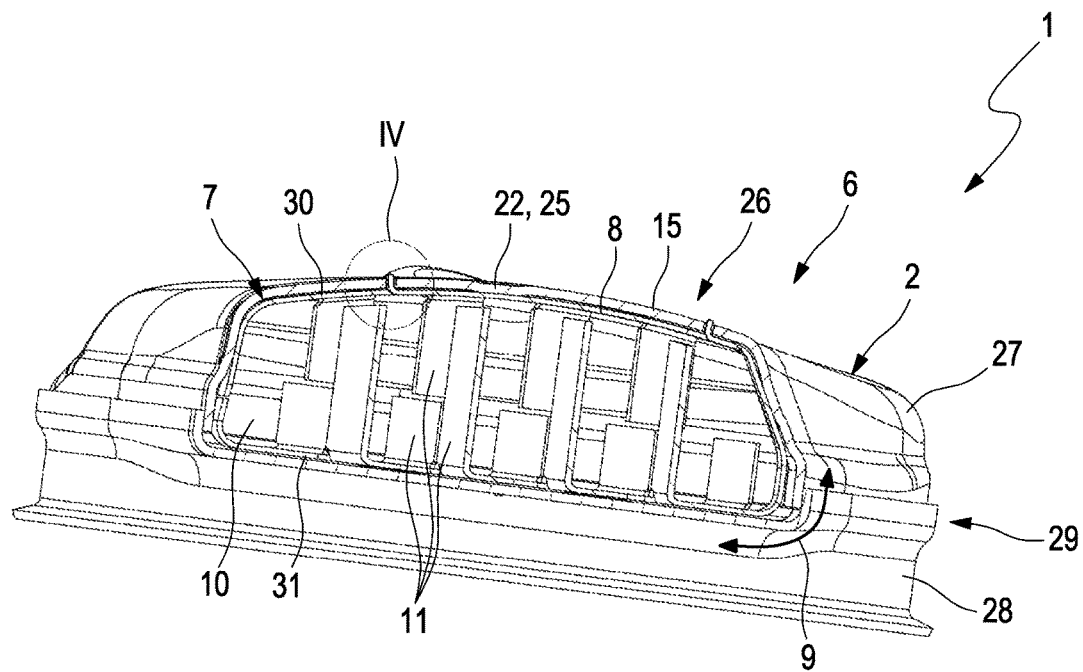
FIG. 3 is a schematic sectional view of the exhaust gas treatment device corresponding to section lines III in FIG. 2.
Figure 4:
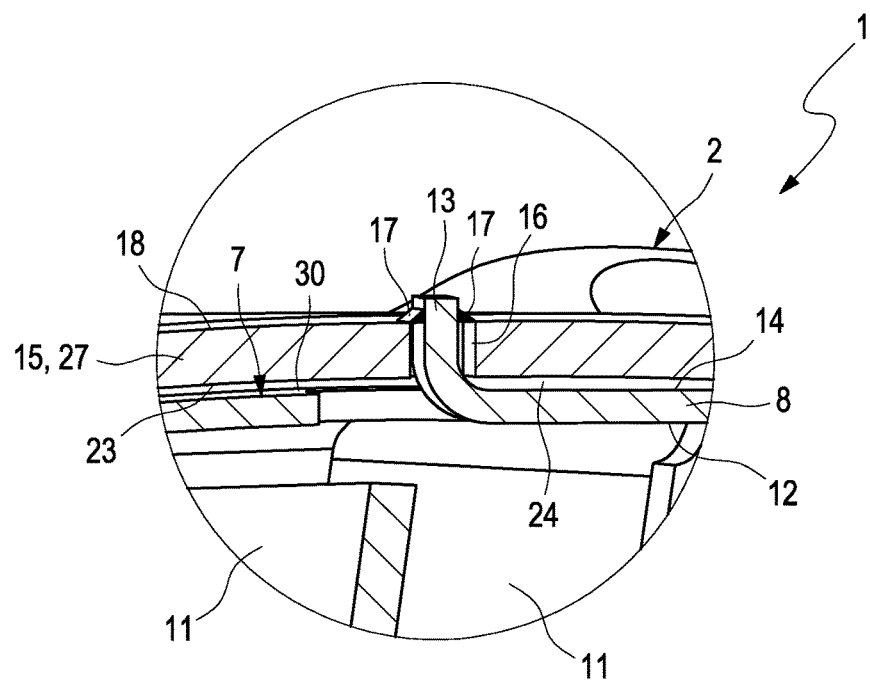
FIG. 4 is a schematic enlarged view of a detail IV from FIG. 3.
Figure 5:
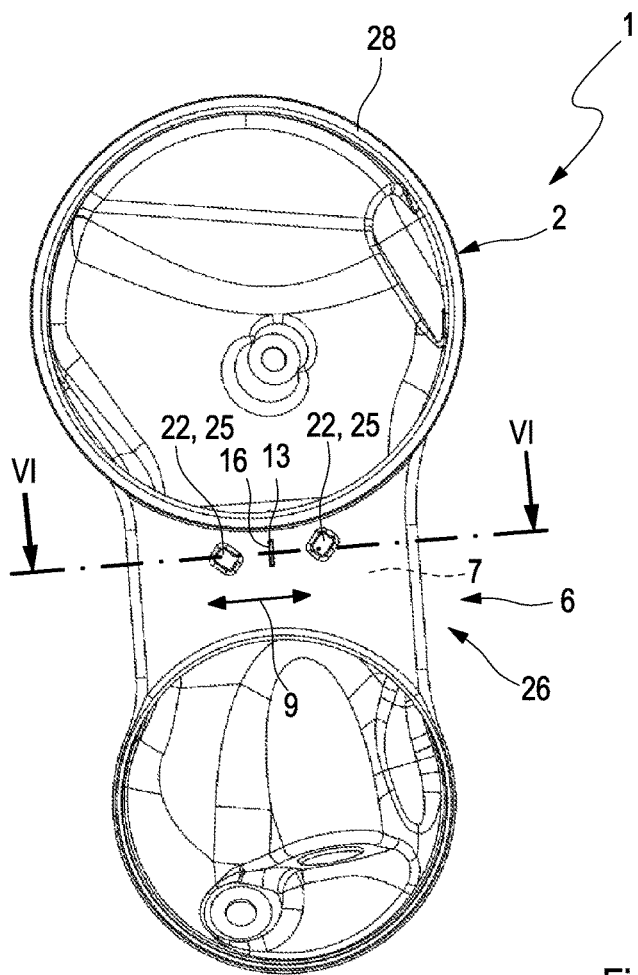
FIG. 5 is a schematic view of the exhaust gas treatment device according to view direction V in FIG. 1.
Figure 6:
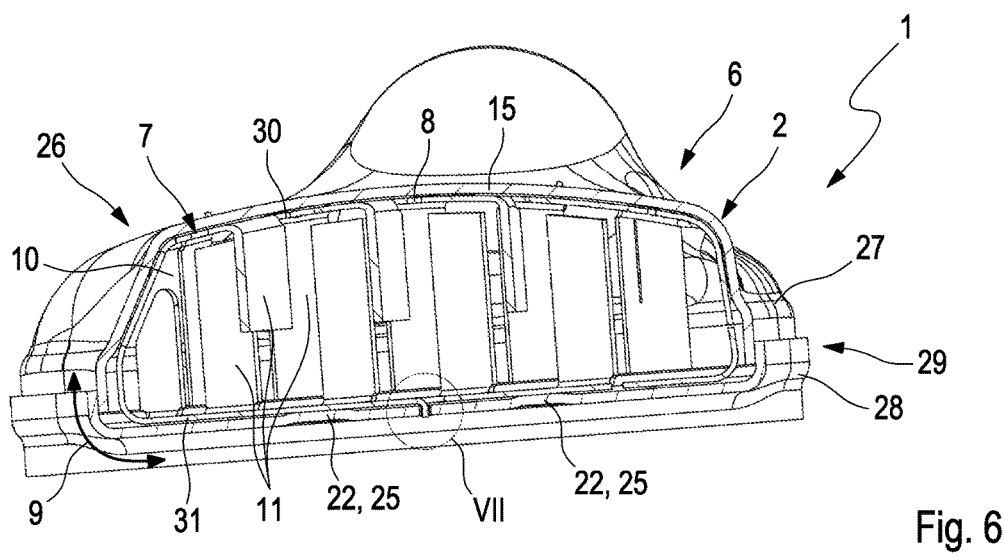
FIG. 6 is a schematic sectional view of the exhaust gas treatment device according to section lines VI in FIG. 5.
Figure 7:
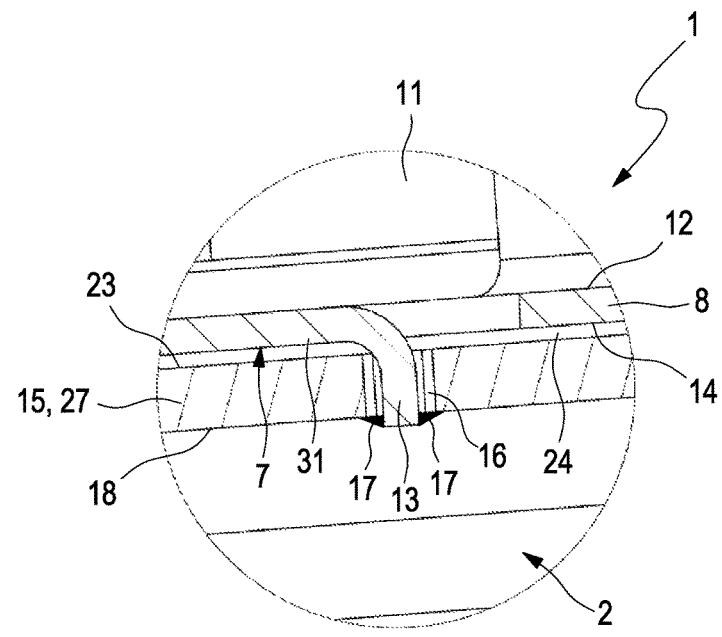
FIG. 7 is a schematic enlarged detail VII from FIG. 6.

The supporting zones 22 are formed by elevations 25, which in the case of the embodiments shown here are each integrally shaped on the housing wall 15 by forming. Accordingly, the elevations 25 project from the housing 2 or from the housing wall 15 to the inside in the direction of the mixer 7. In the embodiments shown in the FIGS. 1 to 7, the supporting zones 22 are positioned spaced from the straps 13 in the circumferential direction 9, in the view of FIG. 2, a supporting zone 22 is arranged in the circumferential direction 9 between two adjacent straps 13. In the view of FIG. 5, by contrast, a strap 13 is arranged in the circumferential direction 9 between two adjacent supporting zones 22.

Figure 8:
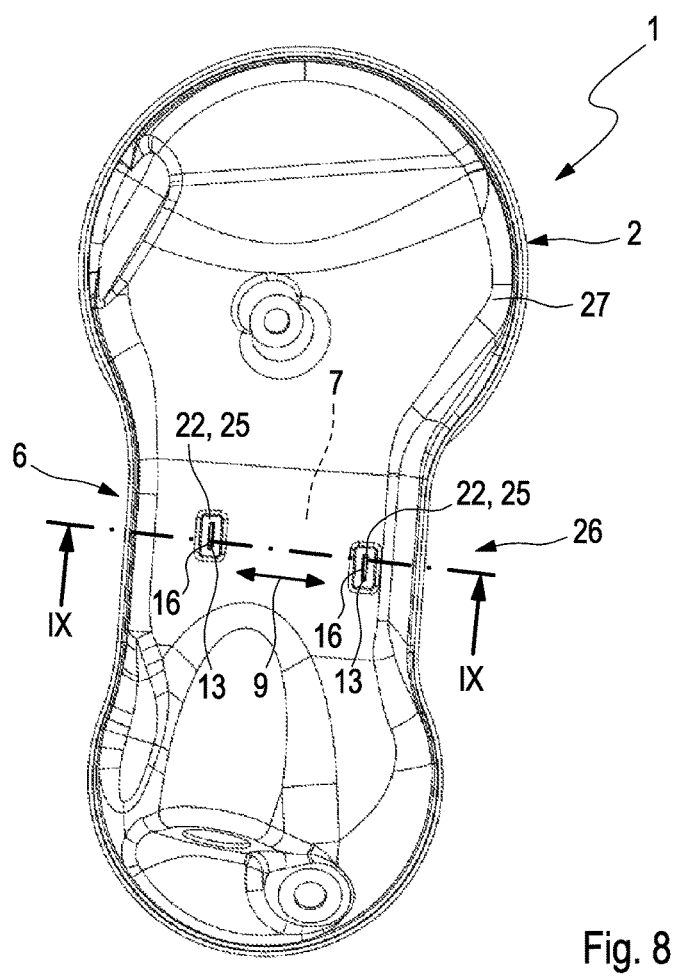
FIG. 8 is a schematic view as in FIG. 2, however showing another embodiment.
Figure 9:
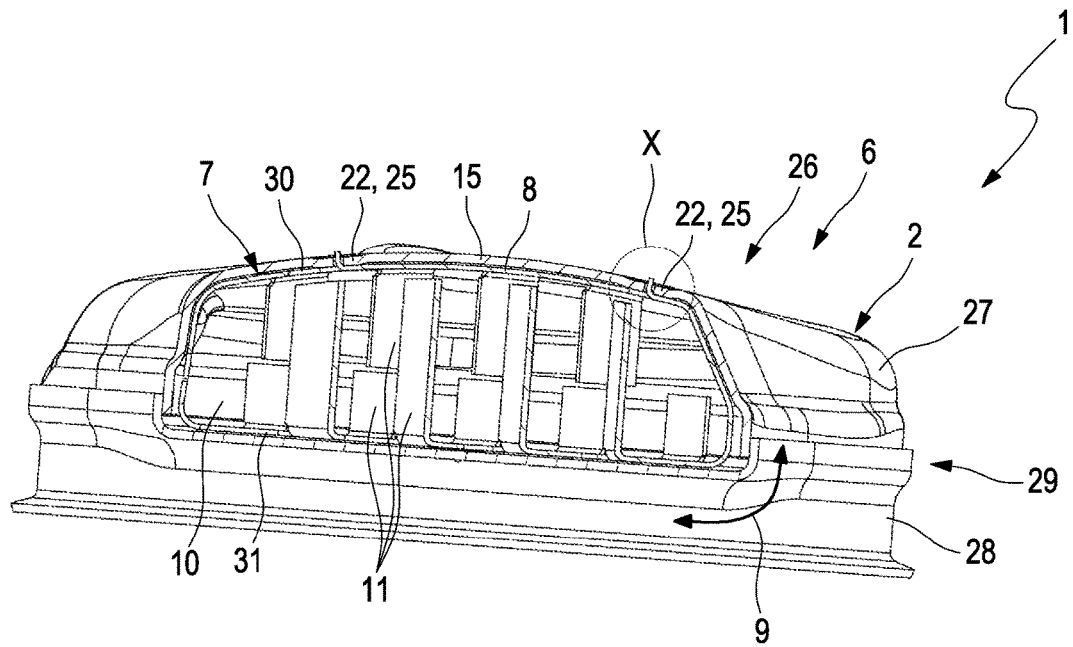
FIG. 9 is a schematic sectional view corresponding to section lines IX in FIG. 8.
Figure 10:
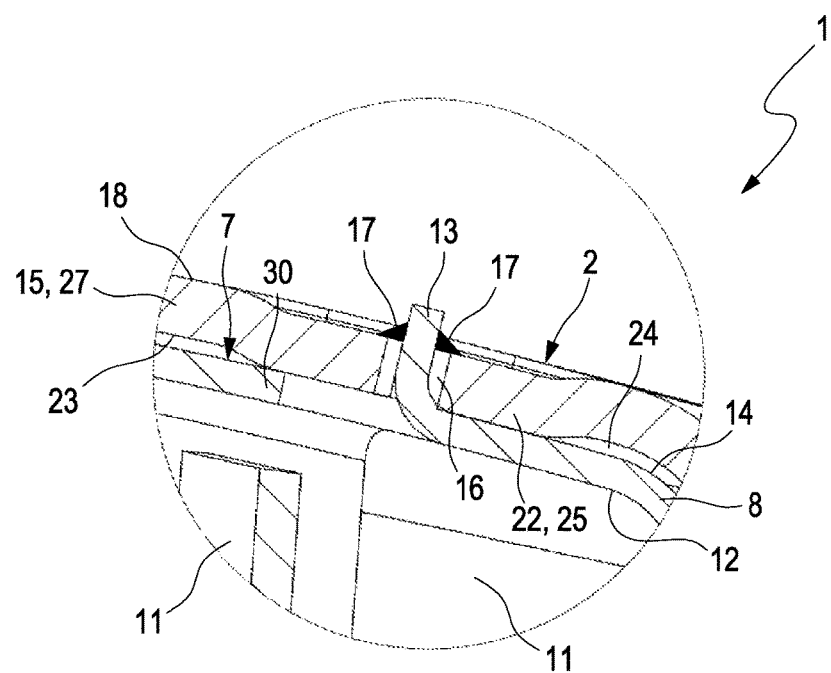
FIG. 10 is a schematic enlarged detail X from FIG. 9.
Figure 11:
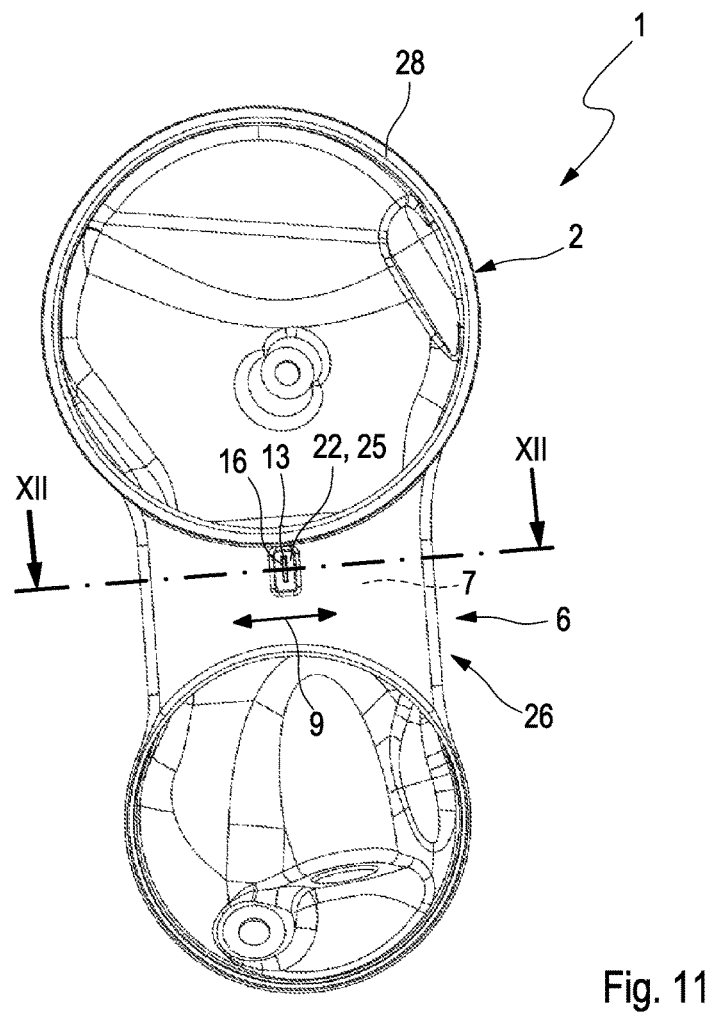
FIG. 11 is a schematic view as in FIG. 5, however showing the other embodiment.
Figure 12:
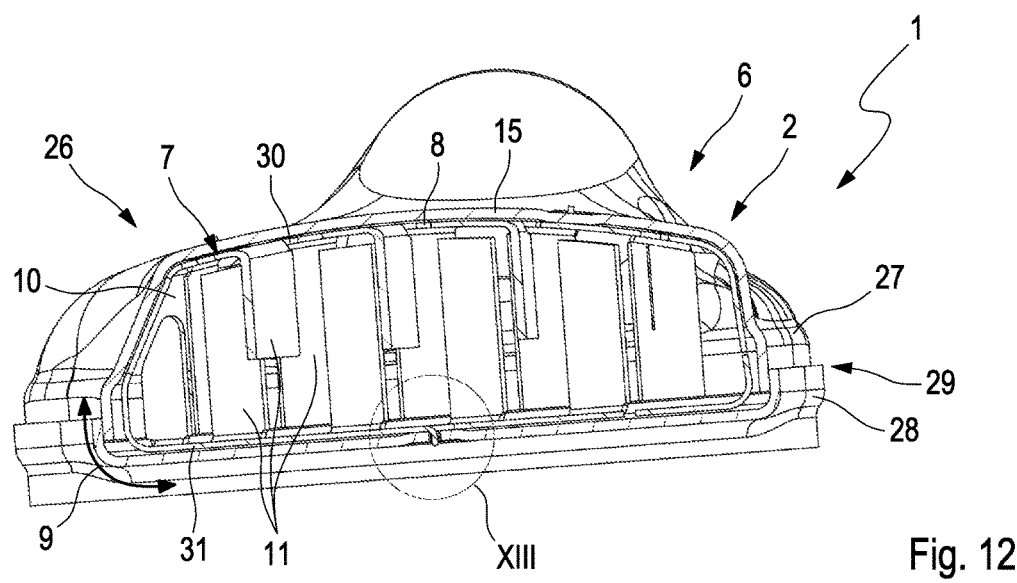
FIG. 12 is a schematic sectional view corresponding to section lines XII from FIG. 11.
Figure 13:
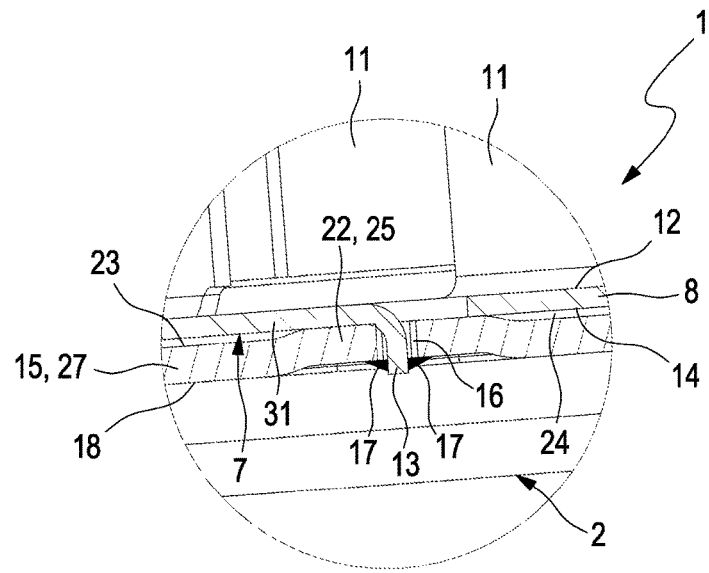
FIG. 13 is a schematic enlarged detail XIII from FIG. 12.
Figure 14:
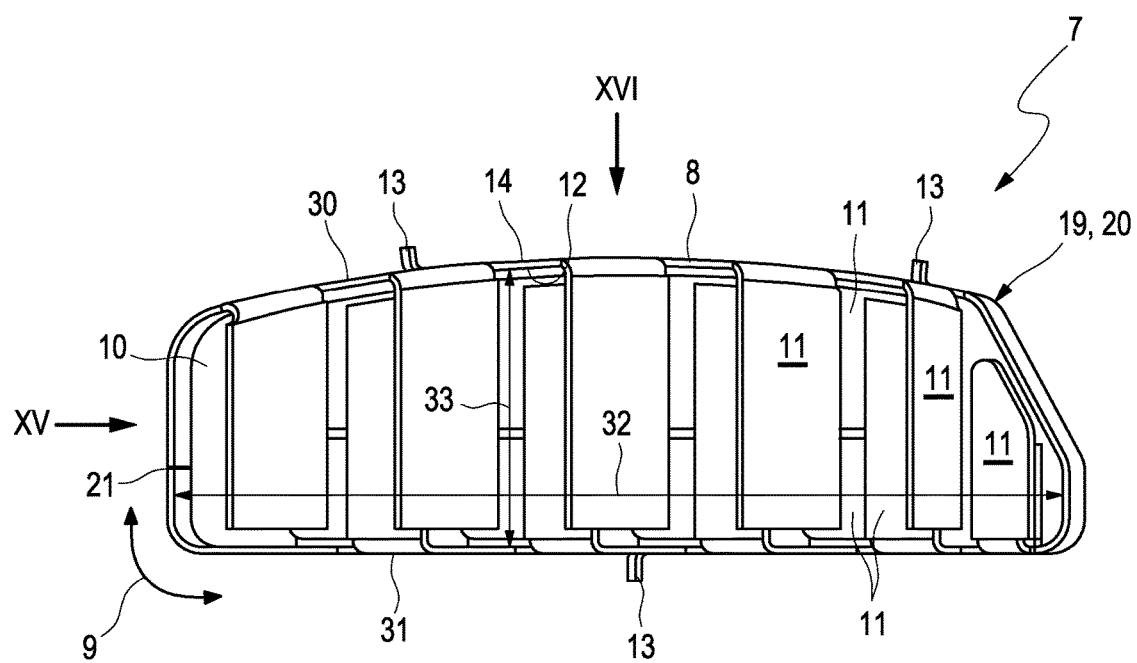
FIG. 14 is a schematic front view of a mixer.

In contrast with this, the FIGS. 8 to 13 show an embodiment, in which the supporting zones 22 are each formed in the region of the straps 13. In this case, the respective strap opening 16 is located within the respective supporting zone 22. Accordingly, the respective strap 16 is also arranged within the respective supporting zone 22. In the view of FIG. 8, two supporting zones 22 are evident, in which, in each case, the interaction between strap 13 and strap opening 16 takes place centrally. In contrast with this, only one supporting zone 22 is evident in the view of FIG. 11, in which the respective strap 13 engages in the associated strap opening 16.

As is evident in particular from the FIGS. 3, 6, 9 and 12, the housing 2, in the housing section 26 shown here, which contains the mixer 7, is configured in a two-shelled manner so that a first shell 27 and a second shell 28 are provided, which are inserted into one another or attached to one another. In the shown example, a substantially flat connection zone 29 is provided, in which the two housing shells 27, 28 are attached to one another.

The mixer 7 is installed in the two-shelled housing section 26 so that a first circumferential section 30 of the shell 8 extends along the first housing shell 27, while a second circumferential section 31 of the shell 8 extends along the second housing shell 28. In the examples shown here, the first circumferential section 30 comprises two straps 13, and the first housing shell 27 comprises the two associated strap openings 16. The second circumferential section 31 by contrast comprises only a single strap 13. The second housing shell 28 comprises the strap opening 16 fitting the same. Both on the first housing shell 27 and also on the second housing shell 28, the elevations 25 in the mixer region 6 are shaped by a stamping process or the like in order to form the contact zones 22.

As is evident in particular from the FIGS. 14 to 17, the mixer cross section 10 is practically flat so that a width 32 of the mixer 7 is greater than a height 33 of the mixer 7. In this case, the inner dimensions are drawn in FIG. 14. The same then applies also to the outer dimensions. In the example, the width 32 is at least twice the size as the height 33.

Furthermore, all guide blades 11 are configured as straight guide blades 11 in this case, which are each orientated parallel to the height direction. Accordingly, all guide blades 11 run parallel to one another. Furthermore, the guide blades 11 in each case project into the mixer cross section 10 in a free-standing manner. They consequently have free ends which do not have any contact with the shell 8.

Figure 15:
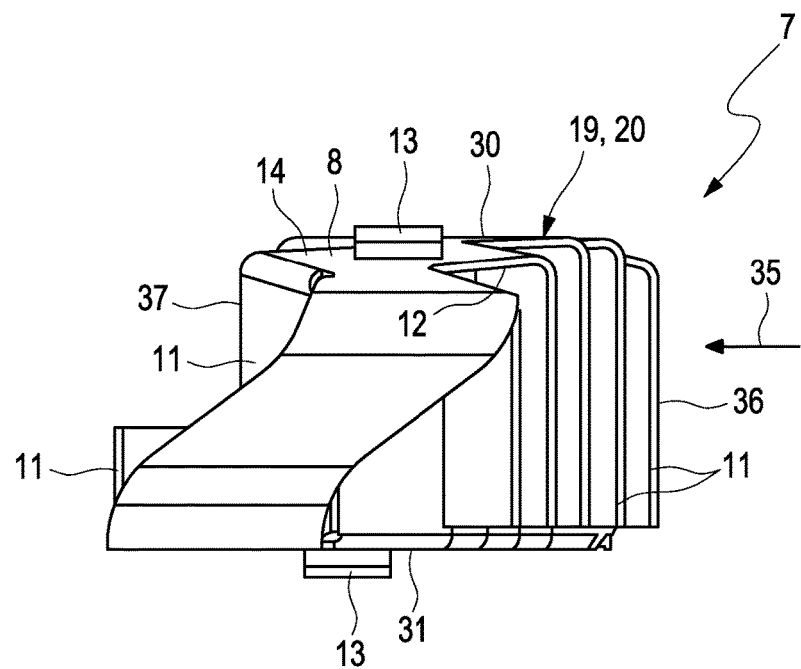
FIG. 15 is a schematic lateral view of the mixer corresponding to view direction XV in FIG. 14.
Figure 16:
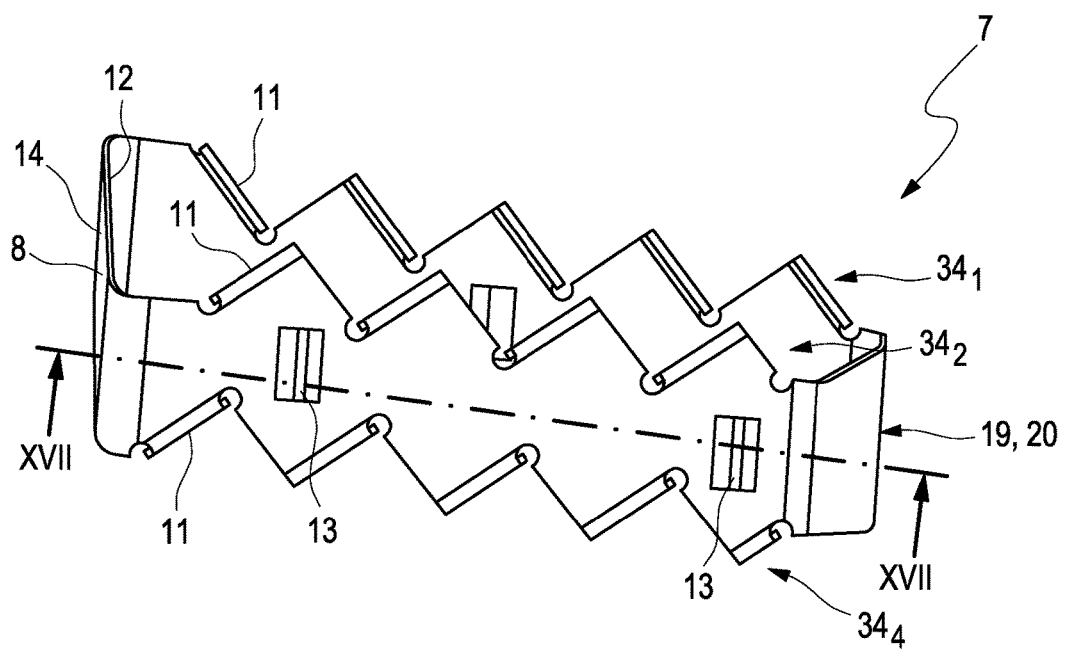
FIG. 16 is a schematic lateral view of the mixer corresponding to view direction XVI in FIG. 14.
Figure 17:
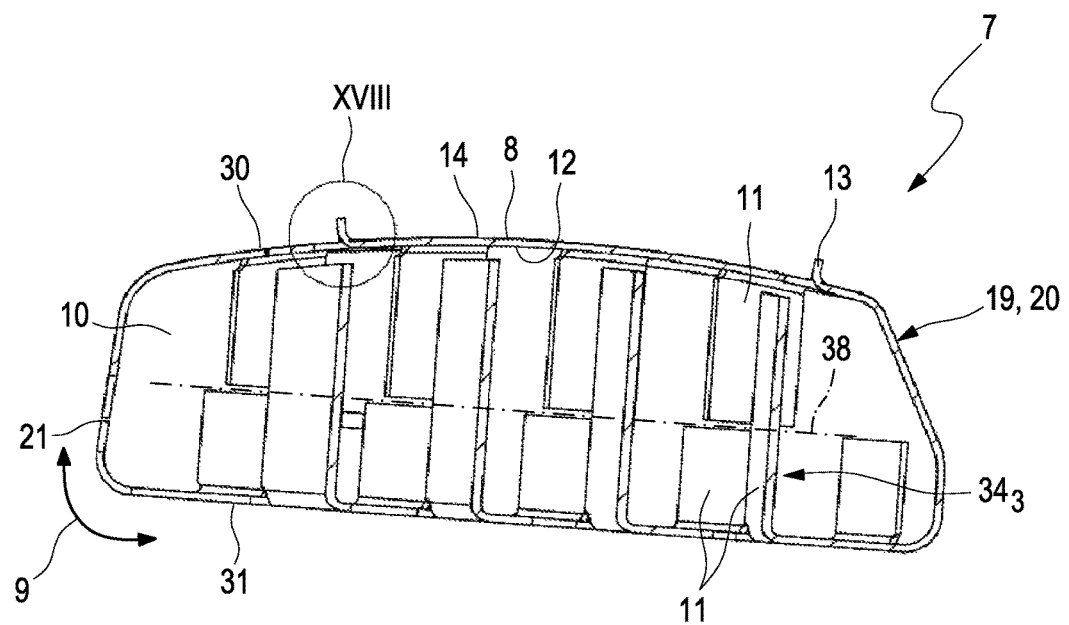
FIG. 17 is a schematic sectional view of the mixer corresponding to section lines XVII in FIG. 16.
Figure 18:
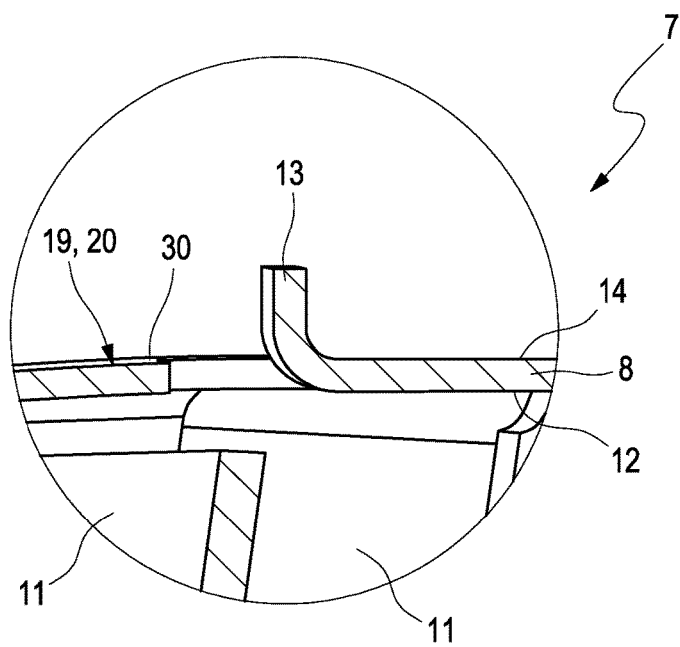
FIG. 18 is a schematic enlarged detail XVIII from FIG. 17.

In the case of the mixer 7 introduced in this case, a total of four guide blade rows 34 are formed, namely a first guide blade row $34_1$, a second guide blade row $34_2$, a third guide blade row $34_3$ and a fourth guide blade row $34_4$. In FIG. 15, a flow direction 35 of the exhaust gas flow is indicated by an arrow. On the inflow sided mixer side 36 and on the outflow-sided mixer side 37, the shell 8 comprises a first circumferential section 30 and a second circumferential section 31 each, which with the flat mixer cross section 10 are located opposite one another. The first circumferential section 30 of the inflow-sided mixer side 36, which can also be called inflow side 36 or inlet side 36, comprises guide blades 11, which from the first circumferential section 30 project in the direction of the second circumferential section 31 and which in the example form the fourth guide blade row $34_4$. On the inflow-sided mixer side 36, which can also be called inflow side 36 or inlet side 36, the second circumferential section 31 comprises guide blades 11, which project from the second circumferential section 31 in the direction of the first circumferential section 30. These guide blades 11 in the example form the third guide blade row $34_3$. On the outflow-sided mixer side 27, which can also be called outflow side 37 or outlet side 37, the first circumferential section 30 comprises guide blades 11, which project from the first circumferential section 30 in the direction of the second circumferential section 31, and which in the example form the second guide blade row $34_2$. Finally, on its outflow-sided mixer side 37 on the second circumferential section 31, the shell 8 comprises guide blades 11 which project from the second circumferential section 31 in the direction of the first circumferential section 30 and which in the example form the first guide blade row $34_1$.

On the respective mixer side 36, 37, the guide blades 11 of the first circumferential section 30 are arranged offset in the flow direction 35 relative to the guide blades 11 of the second circumferential section 31. Accordingly, the exhaust gas flow consecutively flows about or flows through the four guide blades rows 34 shown in this case. The two guide blade rows $34_3$ and $34_4$ of the inflow-sided mixer side 36 each extend over the entire height 33 of the mixer 7. In this case, the guide blades 11 of the third guide blade row $34_3$ and the guide blades 11 of the fourth guide blade row $34_4$ are set at an angle opposite to the exhaust gas flow.

Opposite blade angles are also provided in the case of the two guide blade rows $34_1$ and $34_2$ of the outflow-sided mixer side 37. There it is additionally provided that the guide blades of the first guide blade row $34_1$ and of the second guide blade row $34_1$ are designed differently in size. In particular it is evident that the guide blades 11 of the first guide blade row $34_1$ and of the second guide blade row $34_1$ each do not extend over the entire height 33 of the mixer 7. It is rather evident from the FIGS. 14 and 17 that a guide blade 11 each of the first guide blade row $34_1$ and a guide blade 11 each of the second guide blade row $34_2$ jointly reach the height 33 of the mixer 7. In particular, a separating plane 38 is evident, which is located between the two circumferential sections 30, 31. The guide blades 11 of the first guide blade row $34_1$ extend from the second circumferential section 31 only as far as to the separating plane 38. The guide blades 11 of the second guide blade row $34_2$ by contrast extend from the first circumferential section 30 only as far as to the separating plane 38.

While specific embodiments of the invention have been shown and described in detail to illustrate the application of the principles of the invention, it will be understood that the invention may be embodied otherwise without departing from such principles.

What is claimed is:

1. An exhaust gas treatment device for an exhaust system of an internal combustion engine, the device comprising:
   a housing through which an exhaust gas path leads;
   an injector arranged on the housing for introducing a reduction agent into an exhaust gas flow following the exhaust gas path; and
   a mixer arranged in the housing for mixing-through the reactant with the exhaust gas flow, wherein:
   the mixer comprises a shell, which encloses a mixer cross section through which the exhaust gas flow can flow;
   the mixer comprises multiple guide blades, which on a shell inside project from the shell and project into the mixer cross section;
   the mixer comprises multiple straps, which on a shell outside project from the shell and in each case project into a strap opening formed on the housing and penetrate a housing wall of the housing;
   the mixer is a shaped single sheet metal part comprised of a single sheet metal piece, in which the shell, the guide blades and the straps are formed by the single sheet metal piece;
   the mixer, on a shell outside, is radially supported via supporting zones on a wall inside of the housing wall;
   the supporting zones are arranged distributed in a circumferential direction of the shell and spaced from one another; and
   radially, between the shell outside and the wall inside, an air gap is formed outside the straps and outside the supporting zones.

2. A device according to claim 1, wherein:
   the straps are each fastened to the housing from an outside by means of a welded connection; and
   the respective welded connection closes off the associated strap opening.

3. A device according to claim 1, wherein the supporting zones are formed by elevations, which, through forming, are integrally shaped only on the housing wall or only on the shell or both on the housing wall and also on the shell.

4. A device according to claim 1, wherein that the supporting zones are each formed in a region of the straps.

5. A device according to claim 1, wherein that the housing is configured in a two-shelled manner with at least a housing section containing the mixer such that a shell outside extends along a first housing shell in a first circumferential section and extends along a second circumferential section along a second housing shell.

6. A device according to the claim 5, wherein:
   in a region of the first housing shell in the region of the second housing shell at least one of the supporting zones is formed.

7. A device according to claim 5, wherein at least one such strap opening is formed on the first housing shell and on the second housing shell.

8. A device according to claim 1, wherein the shell has a flat cross section with a width is greater than a height.

9. A device according to claim 1, wherein the guide blades are straight and run parallel to one another.

10. The device according to claim 1, wherein the guide blades, at each end, are connected to the shell in a fixed manner and are also arranged on another end in a free-standing manner.

11. The device according to claim 1, wherein:
    the shell, on at least one of an inflow-sided mixer side and on an outflow-sided mixer side comprises a first circumferential section and a second circumferential section which are located opposite one another;
    the first circumferential section comprises guide blades, which project from the first circumferential section in the direction of the second circumferential section;
    the second circumferential section comprises guide blades, which project from the second circumferential section in a direction of the first circumferential section; and
    the guide blades of the first circumferential section are arranged, in the flow direction of the exhaust gas flow, offset from the guide blades of the second circumferential section.

12. A device according to claim 1, wherein that the housing wall defines a flat cross section with a width that is greater than a height.

13. A device according to claim 1, wherein:
    the guide blades are straight and run parallel to one another; and
    the guide blades, at each end, are connected to the housing wall in a fixed manner and are also arranged on another end in a free-standing manner.

14. A device according to claim 1, wherein said shell comprises a first wall portion, a second wall portion, a third wall portion and a fourth wall portion, said first wall portion, said second wall portion, said third wall portion and said fourth wall portion being integrally connected to one another to form a one-piece shell, at least the first wall portion, the second wall portion, the third wall portion and the fourth wall portion defining the mixer cross section through which the exhaust gas flow can flow, said one-piece shell comprising a shell outer surface, said shell outer surface comprising a plurality of housing wall contact surfaces, said housing wall comprising a housing wall inner surface, said housing wall inner surface comprising a plurality of shell contact surfaces, each of said housing wall contact surfaces being in direct contact with one of said shell contact surfaces in a respective supporting zone.

* * * * *